(12) United States Patent
Mestach

(10) Patent No.: US 6,444,749 B2
(45) Date of Patent: Sep. 3, 2002

(54) AQUEOUS DISPERSIONS OF PARTICLES OF POLYMERS WITH A GLASS TRANSITION TEMPERATURE GRADIENT

(75) Inventor: Dirk Emiel Paula Mestach, Nijlen (BE)

(73) Assignee: Akzo Nobel N.V., Arnhem (NL)

(*) Notice: Subject to any disclaimer, the term of this patent is extended or adjusted under 35 U.S.C. 154(b) by 0 days.

(21) Appl. No.: 09/784,915

(22) Filed: Feb. 16, 2001

(30) Foreign Application Priority Data

Feb. 16, 2000 (EP) ............................................. 00200543

(51) Int. Cl.$^7$ ................................................. C08L 35/00
(52) U.S. Cl. ....................................................... 524/827
(58) Field of Search ......................................... 524/827

(56) References Cited

U.S. PATENT DOCUMENTS

| | | | |
|---|---|---|---|
| 3,448,173 A | 6/1969 | Ryan et al. .................. | 260/876 |
| 3,562,235 A | 2/1971 | Ryan .......................... | 260/885 |
| 3,804,881 A | 4/1974 | Bassett et al. .............. | 260/470 |
| 4,089,828 A | 5/1978 | Vasishth et al. ........... | 260/29.6 |
| 5,385,971 A | 1/1995 | Sauer et al. ................. | 524/558 |
| 5,516,836 A | 5/1996 | Sauer et al. ................. | 524/558 |

FOREIGN PATENT DOCUMENTS

| | | | |
|---|---|---|---|
| EP | 0565825 | 10/1993 | ............. C08F/2/16 |
| WO | WO92/001004 | 1/1992 | ............. C08F/2/00 |

OTHER PUBLICATIONS

Copy of International Search Report dated Apr. 20, 2000.

*Primary Examiner*—Edward J. Cain
(74) *Attorney, Agent, or Firm*—Joan M. McGillycuddy

(57) ABSTRACT

The invention pertains to an aqueous dispersion of particles of a polymer having a functional group for cross-linking, which is obtainable by a free radical emulsion polymerization of at least two different ethylenically unsaturated monomers, a surfactant of the formula $M^{+\,-}OOC—CH=CHCOOR$, wherein R is C(6–22) alkyl and $M^+$ is $Na^+$, $K^+$, $Li^+$, $NH_4^+$, or a protonated or quaternary amine, and a co-reactive compound having at least two groups capable of reacting with the functional group for cross-linking, characterized in that the glass-transition temperature (Tg) of the polymer at the center of the particle is different from the Tg of the polymer at the surface of the particle, the difference being at least 55° C., and the Tg of the polymer having the highest Tg is at least 40° C.

10 Claims, No Drawings

AQUEOUS DISPERSIONS OF PARTICLES OF POLYMERS WITH A GLASS TRANSITION TEMPERATURE GRADIENT

This application claims priority of European Patent Application No. 00200543.7 filed on Feb. 16, 2000.

FIELD OF THE INVENTION

The invention pertains to aqueous dispersions of particles of polymers with a glass transition temperature gradient, and to a method for the preparation of the same.

BACKGROUND OF THE INVENTION

Recent changes in the legislation concerning the emission of organic solvents have led to a growing interest in water borne coating systems for industrial applications at ambient temperature. Water borne coating systems have been used for a long time already in applications where the decorative aspects of the coating were more important than the protective properties. The aqueous polymer dispersions that are used as binders in these coatings are often prepared by means of the emulsion polymerization process. Often these binders are thermoplastic acrylic copolymers. The mechanical properties of these systems are related to the high molecular weights that can be obtained by the emulsion polymerization process. A serious drawback to the conventional emulsion polymerization process is the fact that substantial amounts of protective colloids and surfactants must be used. Conventional surfactants or emulsifiers and protective colloids are highly water sensitive and impart poor water resistance to coatings with binders thus prepared. Furthermore, conventional surfactants or emulsifiers and protective colloids often act as plasticizer for the polymers, resulting in reduced blocking resistance. Blocking refers to the tendency of painted surfaces to stick together when placed in contact with each other under pressure. It is important for a coating to have good resistance to blocking, especially when painted surfaces come into contact. The blocking resistance of a coating depends on the polymer's hardness and on external factors such as pressure, temperature, humidity, layer thickness, and drying conditions.

Aqueous polymer dispersions that are free of conventional surfactants using the salt of a monoester of an unsaturated dicarboxylic acid which is copolymerized with the other comonomers are known, for instance from U.S. Pat. No. 4,089,828. These emulsions may be used in textile finishing, paper sizing, industrial finishes, clear films, and air-dry paints. However, although the blocking resistance of these dispersions is satisfactory, paint formulations based on these dispersions possess a volatile organic content (VOC) that is too high according to the latest environmental legislation. Furthermore, paints based on dispersions disclosed in the patent above will lack the balance between hardness (blocking resistance) and flexibility that is required for surface coatings intended for substrates with low dimensional stability such as wood or for substrates that are deformed after the coating has been applied (e.g. metal).

Several techniques are known to those skilled in the art to improve the balance between the required hardness and the flexibility. Step-wise or staged addition procedures such as described in U.S. Pat. No. 3,448,173 or U.S. Pat. No. 3,562,235, where different reactants are introduced into the polymerization reactor at different stages of the reaction, result in the formation of polymer particles possessing a morphology referred to as "core-shell". Other procedures that result in the formation of polymer particles with a non-homogeneous morphology are known, for instance from U.S. Pat. No. 3,804,881, where polymers are produced by continuously introducing a primary polymerizable feed composition from a primary feed source to a polymerization zone, which primary polymerizable feed composition is continually varying in compositional content during the continuous introduction. This variation is obtained by continuously adding to the primary feed source a different secondary polymerizable feed composition from a secondary feed source, so as to continually change the compositional content of the reactants in the primary feed source. Coating compositions formulated with polymer dispersions prepared according to the techniques described above may possess low VOC values and have a favorable balance between flexibility and blocking resistance, yet still contain substantial amounts of water-sensitive surfactants and/or protective colloids. The presence of these water-sensitive compounds in the final coating is undesirable, since it adversely influences properties such as water resistance and gloss retention upon weathering.

SUMMARY OF THE INVENTION

It has now been found that the aforementioned disadvantages can be circumvented by an aqueous dispersion of particles of a polymer having a functional group for cross-linking, which is obtainable by a free radical emulsion polymerization of at least two different ethylenically unsaturated monomers, a surfactant of the formula $M^{+ -}OOC-CH=CHCOOR$, wherein R is C(6–22) alkyl and $M^+$ is $Na^+$, $K^+$, $Li^+$, $NH_4^+$, or a protonated or quaternary amine, and a co-reactive compound having at least two groups capable of reacting with the functional group for cross-linking, characterized in that the glass transition temperature (Tg) of the polymer at the center of the particle is different from the Tg of the polymer at the surface of the particle, the difference being at least 55° C., and the Tg of the polymer having the highest Tg is at least 40° C.

DETAILED DESCRIPTION OF THE INVENTION

Coatings having low VOC using these dispersions as binder show very good flexibility while maintaining superior blocking resistance and gloss retention properties.

A key feature of the present invention is the difference between the Tg of the polymer at the center and the Tg of the polymer at the surface of the particle, although it is not important whether the polymer at the surface has the higher or lower Tg. In principle, two types of particles are envisaged, i.e. core-shell particles with two different polymers in the core and the shell, respectively, having different glass transition temperatures (the gradient thus being a discontinuous gradient), and particles where the composition continuously varies in compositional content from the center to the surface of the particle. The concentration and the Tg gradient may have a linear character, but they may also be convex or concave or have any other character. Particles of this latter type are preferred and can be made by the method of U.S. Pat. No. 3,804,881.

The temperature gradient from the center to the surface leads to glass transition temperatures differing by at least 55° C., with the highest Tg being at least 40° C. More preferably, the difference in Tg is 75° C. and the highest Tg is at least 50° C.

The ethylenically unsaturated emulsion-polymerizable monomers are selected from a monovinylidene aromatic monomer, an α,β-ethylenically unsaturated carboxylic acid ester monomer, a vinyl ester monomer, and combinations thereof.

Accordingly, preferred monovinylidene aromatic monomers include styrene, α-methyl styrene, vinyl toluene, o-, m-, and p-methylstyrene, o-, m-, and p-ethylstyrene, and combinations thereof.

Preferred α,β-ethylenically unsaturated carboxylic acid ester monomers include methyl acrylate, ethyl acrylate, butyl acrylate, methyl methacrylate, butyl methacrylate, tert-butyl acrylate, 2-ethyl hexyl acrylate, and combinations thereof.

Preferred vinyl ester monomers include vinyl acetate, vinyl esters of versatic acid such as the monomers sold by Shell Chemicals as VEOVA™ 9, 10, and 11, acrylonitrile, and combinations thereof.

The monomeric mixture may, if desired, include a chain transfer agent (or more than one chain transfer agent), as well as minor amounts of monomers having more than one ethylenically unsaturated bond.

The polymers have pendant groups, preferably comprising a moiety selected from —COR', —CO—CH$_2$—COCH$_3$ and —CH$_2$OH, wherein R' is H or C(1–4) alkyl. These pending groups make the polymer cross-linkable with co-reactive compounds that are added to the polymer dispersion after the emulsion polymerization process.

The pendant groups can be obtained from the copolymerization of the ethylenically unsaturated monomer with a different ethylenically unsaturated monomer. Examples of such monomers are acrylate esters having a hydroxy group such as hydroxyethyl methacrylate, hydroxyethyl acrylate, hydroxypropyl acrylate, hydroxypropyl methacrylate, hydroxybutyl acrylate. Also monomers having latent hydroxy groups such as glycidyl methacrylate can be used. Particularly preferred monomers are ketone-functional monomers such as the acetoacetoxy esters of hydroxyalkyl acrylates and methacrylates such as acetoacetoxyethyl methacrylate, and also keto-containing amides such as diacetoneacrylamide The choice of the co-reactive compound that is added to the polymer dispersion and that can react with the pendant functional group of the polymer depends on the pendant group. This compound may be either polymer or a low-molecular weight compound. In order to affect cross-linking, the co-reactive compound must possess at least two co-reactive groups.

Examples of suitable co-reactive groups for the given pendant functional groups are known to those skilled in the art. Non-limiting examples are given in Table I.

TABLE I

| Pendant functional group | Co-reactive groups |
| --- | --- |
| oxirane | carboxylic acid, amino, thiol |
| hydroxy | methylol, etherified methylol, isocyanate, aldehyde |
| acetoacetoxy | amino |
| ketone | amino, hydrazide |
| aldehyde | amino, hydrazide |

The polymers optionally contain further functional groups that are used to impart certain properties to the polymer dispersion, such as stability, or to the coating formulated with the polymer dispersion, such as adhesion. The stability of the polymer dispersion can be improved by the use of comonomers with hydrophilic groups such as acid or amide functions.

Typically, the acid-bearing comonomers are olefinically unsaturated carboxyl-functional monomers such as mono carboxyl-functional acrylic monomers and olefinically unsaturated dicarboxyl-bearing monomers. Examples include acrylic acid, methacrylic acid, and itaconic acid. Sulfonic acid-bearing monomers may also be used, such as styrene p-sulfonic acid. An acid-bearing monomer may be polymerized as the free acid or as a salt, e.g. the NH$_4$ or alkali metal salts of ethylmethacrylate-2-sulfonic acid or 2-acrylamido-2-methylpropane sulfonic acid, or the corresponding free acids. Amide-functional comonomers such as acrylamide and methacrylamide may also be used.

Other functional monomers that can be included to improve the adhesion of coatings containing the polymer dispersion comprise tertiary amino or ethylene ureido-functional monomers such as dimethylaminoethyl methacrylate and N-(2-methacryloyloxyethyl)ethylene urea.

The invention also pertains to a method for preparing the aqueous dispersion, characterized in that at least two different ethylenically unsaturated monomers and a surfactant of the formula $M^+ {}^-OOC—CH=CHCOOR$, wherein R is C(6–22) alkyl and $M^+$ is $Na^+$, $K^+$, $Li^+$, $NH_4^+$, or a protonated or quaternary amine are subjected to a free radical emulsion polymerization reaction to obtain particles of a polymer with a functional group for cross-linking, wherein the difference between the Tg of the polymer at the center of the particle and of the polymer at the surface of the particle is at least 550° C., and the highest Tg is at least 40° C., after which a co-reactive compound with at least two groups capable of reacting with the functional group for cross-linking is added.

In a preferred embodiment a gradient of the Tg is obtained by continuously adding one or more ethylenically unsaturated monomers (I) to one or more ethylenically unsaturated monomers (II), at least one of which is different from the one or more monomers (I), with continuous feeding of the mixture of monomers to a reactor where the mixture is subjected to a free radical emulsion polymerization reaction, in order to obtain particles of a polymer having a functional group for cross-linking and a continuous Tg gradient, wherein the difference between the Tg of the polymer at the center of the particle and the polymer at the surface of the particle is at least 55° C., and the highest Tg is at least 40° C.

In a preferred embodiment the functional group for cross-linking with the co-reactive compound is attached to an ethylenically unsaturated monomer in the monomer or the mixture of monomers (I) or (II), which has the lowest Tg according to the Fox equation.

The Fox equation is a well-known equation described in *Bulletin of American Physics Society*, Vol. 1, Issue 3, page 123 (1956), and is used to calculate the Tg of the acrylic polymer that can be obtained from a mixture of acrylic monomers by using the weight fractions and the Tg's of said monomers.

The particles can also be of the core-shell type, wherein the difference between the Tg of the polymer in the core and the polymer of the shell is at least 55° C., and wherein the highest Tg is at least 40° C. Methods for making core-shell polymers are well-known in the art, and any one of the available standard methods for making such particles can be employed.

The dispersions of the invention are suitable to be used in different types of coating compositions (e.g. protective, decorative, or adhesive) on a variety of substrates. For such purposes the dispersions may be combined or formulated with other additives or components, such as defoamers, rheology control agents, thickeners, dispersing and stabilizing agents (usually surfactants), wetting agents, fillers, extenders, fungicides, bactericides, coalescing solvents, wetting solvents, plasticizers, anti-freeze agents, waxes, and pigments.

Substrates to which the coating compositions may be applied include wood, metal, paper, and plastic substrates. The coating compositions may be applied to the substrate by any conventional method such as by brushing, dipping, flow coating, roller coating, and spraying. The dispersions of the invention are particularly suitable for opaque or translucent wood coatings and stains.

Until their use is desired, the coating compositions formulated with the dispersions of this invention can be stored at room temperature in a suitable container. When use is desired, the coating composition is applied to a suitable substrate. After application the volatile components in the coating composition will evaporate. The temperature at which the applied coating is dried can vary from ambient temperature to more elevated temperatures. The maximum temperature often is related to the nature of the substrate. The evaporation and drying of the applied coating will allow the cross-linking reaction between the functional groups on the polymer and the co-reactive compound to take place.

The invention is further illustrated by the following examples.

EXAMPLE 1

Preparation of the Reactive Surfactant

The reactive surfactant used in the following example was prepared as follows. 392 g of maleic anhydride (technical quality) were mixed with 767.2 g of dodecanol (ex Aldrich). The mixture was heated under a nitrogen blanket to 80° C. After about 30 min the mixture turned clear. The reaction mixture of the slightly exothermic reaction was poured out in a dish and allowed to cool to ambient temperature. After cooling a crystalline material was obtained that could easily be ground to a fine powder. The reactive surfactant was used without further purification.

EXAMPLE 2

Polymer Dispersion with Reactive Surfactant

A two-liter double jacketed glass reactor equipped with a two-blade stirrer, a condenser, and inlets for the addition of monomer pre-emulsions, initiator, and other auxiliaries was charged with 417 g of demineralized water, 22.5 g of the reactive surfactant of Example, 1.7 g of sodium hydrogen carbonate, and 0.1 g of a 25% aqueous ammonia solution. This mixture was heated, with stirring, to 70° C.

In the meantime two mixtures were prepared in separate containers A and B by mixing the ingredients given in Table I.

TABLE I

|  | Mixture 1 Container A | Mixture 2 Container B |
| --- | --- | --- |
| demineralized water | 134 | 122 |
| reactive surfactant of Example 1 | 8 | 7 |
| sodium hydrogen carbonate | 2 | 2 |
| ammonia (25% aqueous solution) | 0.85 | 0.35 |
| diacetone acrylamide | 21 |  |
| butyl methacrylate |  | 151 |

TABLE I-continued

|  | Mixture 1 Container A | Mixture 2 Container B |
| --- | --- | --- |
| butyl acrylate | 285 |  |
| methyl methacrylate | 28 | 168 |
| dimetyl aminoethyl methacrylate |  | 13 |
| methacrylic acid | 11 |  |
| triallylcyanurate | 0.5 | 0.5 |

1.24 g of mixture 1 were taken from container A and added to the reactor. After mixing for 10 minutes a solution of 0.75 g of sodium persulfate in 7 g of demineralized water was added to the reactor. After the exothermal reaction had subsided, the monomer addition was started using the following procedure. Simultaneously, the contents of container B were dosed to container A and the contents of container A were pumped into the reactor. The addition rate was controlled in order to have both containers empty after 90 min. Container A was equipped with a stirrer to ensure that the contents were well-mixed.

Simultaneously with the monomer addition, a solution of 1 g of sodium persulfate in 114 g of water was dosed to the reactor. During the monomer addition the temperature was allowed to rise to 85° C. After the additions had been completed, the reactor contents were kept at 85° C. for a further 30 min. The batch was cooled down to 65° C. and a solution of 0.9 g of tert-butyl hydroperoxide (70% aqueous solution) in 3 g of demineralized water was fed to the reactor. A solution of 0.4 g of sodium formaldehyde sulfoxylate in 5 g of demineralized water was then dosed to the reactor over a period of 15 min.

After the addition was completed, the batch was kept at 65° C. for another 30 min. Under stirring 13 g of adipic dihydrazide were dissolved into the contents of the reactor. To ensure proper dissolution stirring and heating were continued for an additional 30 min. The batch was cooled to 30° C., and finally 2 g of a commercial biocide (Acticide™ AS, ex Thor Chemie) were added to the reactor and the contents were filtered through a 80 µm Perlon filter-bag to remove any coagulum.

The resulting polymer dispersion had a particle size of 87 nm and a solids content of 42%. The pH of the dispersion was 8.4 and the viscosity was 0.41 Pa.s (at 23° C.).

Comparative Example 1

Polymer Dispersion with Conventional Surfactant

A polymer dispersion was prepared according to the procedure described in Example 2, but the combination of reactive surfactant from Example 1 and sodium hydrogen carbonate was replaced by the conventional commercially available surfactant Perlankrol™ EP36 (ex Akcros Chemicals). The reactive surfactant-sodium hydrogen carbonate was substituted in the following way.

Initial reactor charge: 22.5 g of Perlankro™ EP36
Mixture 1: 7.5 g of Perlankrol™ EP36
Mixture 2: 7.5 g of Perlankrol™ EP36

The resulting polymer dispersion had a particle size of 117 nm and a solids content of 45%. The pH was 6.8 and the viscosity was 0.38 Pa.s.

Comparative Example 2

Polymer Dispersion with Homogeneous Particles

A polymer dispersion was prepared according to the procedure described in Example 2. However, rather than using two different monomer mixtures only one monomer mixture was used. The composition is given in Table 2.

TABLE 2

| | |
|---|---|
| demineralized water | 257 |
| reactive surfactant of Example 1 | 15 |
| sodium hydrogen carbonate | 4 |
| ammonia (25% aqueous solution) | 1.2 |
| diacetone acrylamide | 21 |
| butyl methacrylate | 151 |
| butyl acrylate | 285 |
| methyl methacrylate | 196 |
| dimetyl aminoethyl methacrylate | 13 |
| methacrylic acid | 11 |
| triallylcyanurate | 1 |

The resulting polymer dispersion had a particle size of 77 nm and a solids content of 43.3 %. The pH of the dispersion was 8.5 and the viscosity was 0.12 Pa.s (at 23° C.).

Comparative Example 3

A polymer dispersion was prepared according to the procedure described in Comparative Example 2. However, no adipic dihydrazide was added. The resulting polymer dispersion had a particle size of 75 nm and a solids content of 43 %. The pH of the dispersion was 8.4 and the viscosity was 0.12 Pa.s (at 23° C.).

EXAMPLE 3

Formulation of Wood Stains

A mill base was prepared by mixing together the following ingredients:

| | |
|---|---|
| water | 403 |
| propylene glycol | 400 |
| Syloid ™ ED30* | 150 |
| ammonia (25% aqueous solution) | 4 |
| Biocide ™ K10** | 3 |
| Primal ™ RM8*** | 40 |

*ex Grace
**ex Thor Chemicals
***ex Rohm and Haas

The desired pigmentation was obtained by mixing the following pigments:

| | |
|---|---|
| Luconyl ™ Gelb 1916* | 0.310 |
| Luconyl ™ Rot 2817* | 0.435 |
| Colanyl ™ Schwarz PR 130** | 0.055 |

*ex BASF AG
**ex Hoechst AG

Wood stains were formulated according to the recipes in Table 3.

TABLE 3

| Wood-stain | 1 | 2 | 3 | 4 |
|---|---|---|---|---|
| binder from Example 2 | 86 | — | — | — |
| binder from Comparative Example 1 | — | 80 | — | — |
| binder from Comparative Example 2 | — | — | 83 | — |
| binder from Comparative Example 3 | — | — | — | 84 |
| ammonia (25%) | 0.4 | 0.4 | 0.4 | 0.4 |

TABLE 3-continued

| Wood-stain | 1 | 2 | 3 | 4 |
|---|---|---|---|---|
| Byk ™ 026* | 0.2 | 0.2 | 0.2 | 0.2 |
| Mill base | 10 | 10 | 10 | 10 |
| Aquacer ™ 490 A** | 2.5 | 2.5 | 2.5 | 2.5 |
| pigmentation | 0.8 | 0.8 | 0.8 | 0.8 |
| Primal ™ RM8 (33% in water) | 5.3 | 5.3 | 5.3 | 5.3 |

*ex Byk-Chemie
**ex Suddeutsche Emulsions-Chemie

The wood stains obtained were evaluated for the "in can" appearance of the wood stain (milkyness), blocking resistance, and impact resistance (Table 4). The blocking resistance was tested by placing two coated surfaces in contact with each other under a fixed pressure for a given time and temperature. In these experiments the coatings were applied onto Leneta charts. Rectangular pieces measuring 25×50 mm were cut out after the specified drying time (at 23° C. and 50% relative humidity). The test pieces were attached to glass microscope slides with double-sided adhesive tape. The coated sides were put face to face and a weight of 1000 grams was applied for two hours (at ambient temperature).

The two surfaces were then separated and the force required was measured with a BYK Gardner Blocking Tester. The lower the force, the better the blocking resistance.

The impact resistance was tested as follows. The coating was applied in a layer thickness of 300 μm on a paper-coated gypsum board. The coating was dried for the specified time at 23° C. and 50% relative humidity. A steel ball weighing approximately 33 g was dropped from a height of one meter onto the coated board. The impact zone was inspected with a magnifying glass. The coating passed the test when no cracks were visible in the coating.

TABLE 4

| Wood stain | 1 | 2 | 3 | 4 |
|---|---|---|---|---|
| binder | from Example 2 | from Comparative Example 1 | from Comparative Example 2 | from Comparative Example 3 |
| milkyness | OK | not OK | not OK | not OK |
| blocking resistance (200 μm layer thickness) | | | | |
| after 2 days at 23° C. | 1.1 N/cm$^2$ | 4.1 N/cm$^2$ | 8.7 N/cm$^2$ | >10 N/cm$^2$ |
| after 7 days at 23° C. | 0.0 N/cm$^2$ | 3.3 N/cm$^2$ | 6.0 N/cm$^2$ | 8.8 N/cm$^2$ |
| impact resistance | | | | |
| after 3 days at 23° C. | OK | OK | OK | OK |
| after 10 days at 23° C. | OK | OK | OK | OK |

These results make it clear that the binder prepared according to the procedure of Example 2 gives the best combination of blocking resistance and flexibility. Wood stains 3 and 4 are not suitable for further evaluation.

In the following test wood stains 1 and 2 were blended with 2% of a coalescing aid (Dowanol™ PM, ex Dow Chemicals) in order to improve film formation. The modified stains were applied onto a wooden test piece and allowed to dry for 7 days at ambient temperature (23° C.) or at 50° C. The coated wood sample was then immersed in water for 15 days. After this time the test piece was taken out of the water and allowed to dry. During both stages the amount of water that was taken up or released was followed gravimetrically. In Table 5 the weight difference is given.

TABLE 5

|  | Wood stain | | | |
| --- | --- | --- | --- | --- |
| drying temperature (° C.) | 1<br>23 | 2<br>23 | 1<br>50 | 2<br>50 |
| start | 0 | 0 | 0 | 0 |
| Day 1 | 2.6 | 2.8 | 2.4 | 2.7 |
| day 2 | 3.4 | 4.0 | 3.3 | 4.2 |
| day 4 | 4.5 | 5.3 | 4.5 | 6.0 |
| day 7 | 5.4 | 6.7 | 5.9 | 7.3 |
| day 9 | 5.7 | 7.3 | 6.5 | 7.8 |
| day 11 | 6.0 | 7.9 | 7.0 | 8.2 |
| day 14 | 6.6 | 8.8 | 7.6 | 8.8 |
| day 15 | 5.2 | 5.7 | 6.4 | 6.7 |
| day 16 | 4.2 | 4.2 | 5.5 | 5.6 |
| day 18 | 3.1 | 2.8 | 4.3 | 4.4 |
| day 23 | 1.6 | 1.4 | 3.0 | 3.0 |
| day 28 | 1.1 | 0.9 | 2.5 | 2.5 |

The results of this Table show that the wood stain formulated with the dispersion of Example 2 with reactive surfactant reduces the uptake of water by the wood. On the other hand, the coating does not hinder the transport of water during the drying stage. Finally, the wood stains were applied (150 g/m$^2$) onto meranti wood primed with 100 g/m$^2$ of Cetol™ WP560 (ex Akzo Nobel Coatings). After drying for seven days at ambient temperature the test panels were exposed to UV-B radiation (wavelength 313 nm) in an Atlas UVCON Accelerated aging cabinet, alternating cycle of 4 h UV, 4 h condensation 50° C. throughout.

At regular intervals the gloss was measured at an angle of 60°. After 800 light hours in the apparatus, the residual gloss of wood stain 2 was 37%. The residual gloss of wood stain 1 was 54%. It took 1200 light hours to reduce the residual gloss level of wood stain 1 to 37%. It can be concluded that wood stains formulated with polymer dispersions prepared with reactive surfactant according to Example 2 have superior weathering properties compared to polymer dispersions prepared with a conventional surfactant.

I claim:

1. An aqueous dispersion of polymer particles having a functional group for cross-linking, is obtained by a free radical emulsion polymerization of at least two different ethylenically unsaturated monomers, a surfactant of the formula $M^{+-}OOC-CH=CHCOOR$, wherein R is C(6–22) alkyl and $M^+$ is $Na^+$, $K^+$, $Li^+$, $NH_4^+$, or a protonated or quaternary amine, and a co-reactive compound having at least two groups capable of reacting with the functional group for cross-linking, wherein the glass transition temperature (Tg) of the polymer at the center of the particle is different from the Tg of the polymer at the surface of the particle, the difference being at least 55° C., and the Tg of the polymer having the highest Tg is at least 40° C.

2. The dispersion of claim 1 wherein the particle is a core-shell particle wherein the Tg of the core polymer and the Tg of the shell polymer differ by at least 55° C., and the highest Tg is at least 40° C.

3. The dispersion of claim 1 wherein the Tg of the polymer at the center of the particle continuously increases or decreases with respect to the Tg of the polymer at the surface of the particle, with the Tg of the polymer at the center and the Tg of the polymer at the surface differing by at least 55° C., and the highest Tg being at least 40° C.

4. The dispersion of claim 1 wherein the difference between the Tg of the polymer at the center of the particle and the polymer at the surface of the particle is at least 75° C., and the highest Tg is at least 50° C.

5. The dispersion of claim 1 wherein the functional group for cross-linking is a pendant group comprising a moiety selected from $-COR'$, $-CO-CH_2-COCH_3$, and $-CH_2OH$, wherein R' is H or C(1–4) alkyl.

6. The dispersion of claim 5 wherein the functional group for cross-linking is obtained by copolymerization of the ethylenically unsaturated monomer diacetoneacrylamide or acetoacetoxyethyl methacrylate with a different ethylenically unsaturated monomer.

7. The dispersion of claim 1 wherein the co-reactive compound capable of reacting with the functional group for cross-linking has at least two groups selected from a carboxylic acid, amino, thiol, methylol, etherified methylol, isocyanate, aldehyde, and hydrazide moiety.

8. A method for preparing the aqueous dispersion of claim 1, wherein at least two different ethylenically unsaturated monomers and a surfactant of the formula $M^{+-}OOC-CH=CHCOOR$, wherein R is C(6–22) alkyl and $M^+$ is $Na^+$, $K^+$, $Li^+$, $NH_4^+$, or a protonated or quaternary amine are subjected to a free radical emulsion polymerization reaction to obtain particles of a polymer with a functional group for cross-linking, wherein the difference between the Tg of the polymer at the center of the particle and the polymer at the surface of the particle is at least 55° C., and the highest Tg is at least 40° C., after which a co-reactive compound with at least two groups capable of reacting with the functional group for cross-linking is added.

9. The method according to claim 8 wherein one or more ethylenically unsaturated monomers (I) are continuously added to one or more ethylenically unsaturated monomers (II), at least one of which is different from the one or more monomers (I), with continuous feeding of the mixture of monomers to a reactor where the mixture is subjected to a free radical emulsion polymerization reaction, in order to obtain particles of a polymer having a functional group for cross-linking and a continuous Tg gradient, wherein the difference between the Tg of the polymer at the center of the particle and the polymer at the surface of the particle is at least 55° C., and the highest Tg is at least 40° C.

10. The method according to claim 9 wherein the functional group for cross-linking with the co-reactive compound is attached to an ethylenically unsaturated monomer in the monomer or the mixture of monomers (I) or (II), which has the lowest Tg according to the Fox equation.

* * * * *